United States Patent
Behr et al.

[11] Patent Number: 6,099,169
[45] Date of Patent: Aug. 8, 2000

[54] TERMINAL FOR FIBEROPTIC CABLE

[75] Inventors: Thorsten Behr, Horn-bad Meinberg; Roland Berg, Hoxter; Jurgen Brand, Detmold; Heinz Reibke, Bad Salzuflen, all of Germany

[73] Assignee: Phoenix Contact GmbH, Blomberg, Germany

[21] Appl. No.: 09/110,158

[22] Filed: Jul. 6, 1998

[30] Foreign Application Priority Data

Jul. 3, 1997 [DE] Germany ............................ 197 28 492
Jul. 25, 1997 [DE] Germany ............................ 197 32 092

[51] Int. Cl.[7] .................................................. G02B 6/36
[52] U.S. Cl. ............................................... 385/88; 385/92
[58] Field of Search .......................................... 385/88–92

[56] References Cited

U.S. PATENT DOCUMENTS 5,230,030  7/1993  Hartman et al. ............................ 385/88

FOREIGN PATENT DOCUMENTS 33 13 835  11/1983  Germany .
37 27 092  11/1988  Germany .
195 12 110  10/1996  Germany .

*Primary Examiner*—James Phan
*Attorney, Agent, or Firm*—Nixon Peabody LLP; David S. Safran

[57] ABSTRACT

A terminal for at least one fiberoptic cable comprising a housing with a front face having at least one slot therein for receiving an end of a fiberoptic cable, at least one optical transmitter and/or receiver, a fitting element which is movable within the housing by sliding and which has at least one insertion opening for a fiberoptic cable to be joined to the at least one transmitter and/or receiver, and with a cutter which has at least one blade. The at least one insertion opening of the fitting element and an actuating arrangement for sliding of the fitting element between a mounting position for receiving the at least one fiberoptic cable and an operating position in which the at least one fiberoptic cable is joined to the at least one transmitter and/or receiver are at the same side of the housing. The housing is provided with at least one cable duct for discharging cut-off pieces of the at least one fiber optic cable. Additionally, longitudinal ribs can be formed on an inner face of the at least one slot means for relieving strain on a fiberoptic cable pushed into the at least one slot between the longitudinal ribs.

22 Claims, 3 Drawing Sheets

TERMINAL FOR FIBEROPTIC CABLE

BACKGROUND OF THE INVENTION

1. Field of the Invention

The invention relates to a terminal for at least one fiberoptic cable, with a housing 3 with a front surface having at least one slot, with at least one optical transmitting and/or receiving means, with a fitting element which can move in the housing 3 by sliding and which has at least one insertion opening for defined joining of the fiber optic cable to the transmitting and/or receiving means, and with a cutting means which has at least one blade, in the end state, the front face of the fiber optic cable interacting with the contact face of the transmitting/or receiving means.

2. Description of Related Art

A fiber optic cable is an optical component suitable for light transport which often consists of a plurality of, relative to its length, very thin individual glass fibers combined into a bundle; however, in the following, a fiber optic cable is also defined as one with a single fiber. Fiber optic cables also include those optical components which are not made of glass fibers, being formed, for example, of plastic; generally dielectric (optical) waveguides will also be encompassed by the term fiberoptic cable.

Light transport in the axial direction through each individual fiber of the bundle takes place by total reflection on the walls of the fiber cores. To enable the total reflection necessary for light propagation in the fiber, the fiber core of each individual fiber is surrounded by a wall, the so-called jacket, which has a refractive index which is lower than that of the core; generally, the jacket is a closed glass jacket. Fiber optic cables are used to guide the light acting as the carrier oscillation, for example, in optical telecommunications. Transmitters can be, for example, laser diodes and LEDs, while receivers can be, for example, photodiodes. The carrier frequency of the light, which is much higher than that of electrical signals, makes it possible to transmit larger amounts of data in the same time or the same amounts of data in a shorter time than with conventional coaxial cables. Losses in the fiber optic cables can be further reduced by development both of the transmitting and receiving means and also the fiber optic cables.

Connection of two fiber optic cables or connection of one fiber optic cable to a certain component, however, is generally difficult since, in the case of imprecise contact of the front face of the fiber optic cable with the component or fiber optic cable to be connected, distortion of the corresponding signals and/or power loss can occur. Therefore, there is a growing demand for fiberoptic cable terminals which can be quickly connected and which are easy to handle.

German Patent DE 3727092 C1 discloses a fiber optic terminal for receiving and holding an optical fiber in which the fiber optic cable can be inserted into a guide channel of an insert housing which is displaceable within a guide housing, together with the cable, between an insert position and a mounting position by means of a set screw. When the fiber optic cable is moved from the mounting position into the insert position, the front end of the fiber optic cable is cut off by a blade that is fixed in the guide housing. In the optical fiber terminal of this patent, connection of the fiber optic cable to a certain optical component depends on exact positioning of the guide housing relative to the optical component, for example, a second fiber optic cable.

Published German Patent Application DE 195 12 110 A1 discloses a terminal for a fiberoptic cable in which a transmitting and/or receiving means is integrated in the housing so that the fiber optic cable with its front face, in the clamped state, interacts with the contact face of the transmitting and/or receiving means.

SUMMARY OF THE INVENTION

The primary object of this invention is to improve the initially mentioned terminal for a fiberoptic cable such that connection of a fiber optic cable is also possible without difficulty when the terminal is already in the installed state.

This object is achieved in accordance with the present invention by enabling insertion of the fiber optic cable into the insertion opening of the fitting element and actuation of the fitting element for defined joining of the fiber optic cable and transmitting and/or receiving means from one side. This ensures that, in the installed state of the terminal, one or more fiber optic cables can be replaced without the need to dismount the terminal. The front face of the housing which has a slot through which the fiber optic cable can be inserted into the insertion opening of the fitting element must always remain free for reasons of function, even in the installed state of the terminal. In the terminal according to the invention, however, only the front surface of the housing need be accessible from the outside.

Advantageously, to actuate the fitting element in the front face of the housing, there is another slot, and in the fitting element, there is an engagement opening for engaging the actuating means. If there is a recess which acts as an abutment for the actuating element in one wall of a receiving space for the fitting element facing away from the other slot, the fitting element can be moved within the housing with an expenditure of force which is reduced as compared to a design without abutments as a result of the lever principle.

According to another teaching of the invention which is of importance separately from the above described measures, the housing has at least one cable duct for accommodating the cut pieces of fiberoptic cable. Here, the outlet opening of the cable duct is advantageously in the front face of the housing. This ensures that the pieces of fiberoptic cable cut off by the cutting means cannot fall into the interior of a device which holds the terminal, but are guided in the cable duct. If a correspondingly large number of pieces of fiber optic cable have collected in the cable duct, they fall out of the outlet opening on the front face of the housing.

According to another advantageous embodiment of the invention, which will be addressed only briefly here, on the inner face of at least one slot, longitudinal ribs are formed as strain relief for the fiber optic cable pushed into the slot.

When the contact face of the transmitting and/or receiving means is not made flat, but, as is advantageous for reasons of beam optics, is concave, according to another teaching of the invention which is also important separately from the above described measures, the longitudinal ribs are preferably bent in toward the interior of the housing in their bottom area. The longitudinal ribs described above, due to their special function, can also have only this function, therefore, as described above, cannot be made as strain relief for the fiber optic cable pushed into the slot. In the embodiment described above and in the function of the longitudinal ribs, the piece of fiberoptic cable cut off straight by the blade of the cutting means is pushed through the lower bent area of the longitudinal ribs towards the transmitting and/or receiving means as the fitting element continues to move down.

In particular, there are a host of possibilities for embodying the terminal for fiberoptic cable in accordance with the invention. For this purpose reference is made to the following description of one preferred embodiment in conjunction with the drawing.

DETAILED DESCRIPTION OF THE PREFERRED EMBODIMENT

Figure 1:
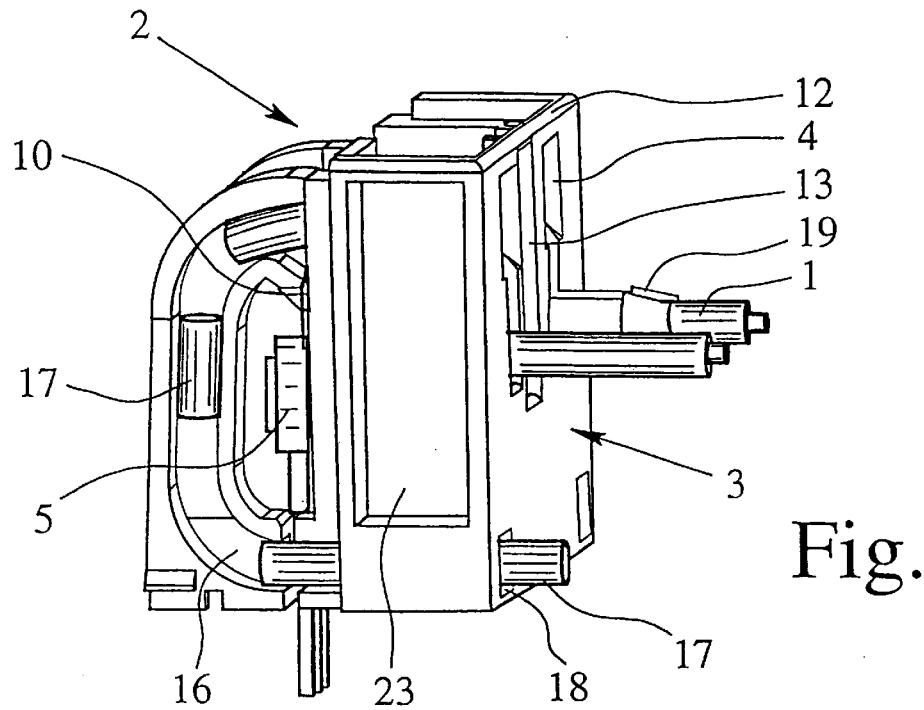
FIG. 1 is a perspective view from one side of one version of a terminal according to the invention in the operating position.

FIGS. 1 through 5 show a terminal 2 for two fiberoptic cables 1. The terminal 2 is comprised of a housing 3 with a front face in which two slots 4 are formed through which the fiberoptic cables 1 can be easily inserted into the interior of the terminal housing 3. In the housing 3, two optical transmitting and/or receiving devices 5 are integrated such that a fitting element 7, which has two insertion openings 6, in the operating position, positions two fiber optic cables 1 such that faces 8 of the fiberoptic cables 1 are opposite contact faces 9 of optical transmitting and/or receiving means 5. The housing 3 of the terminal 2, moreover, has a blade 10 which is located in a horizontally fixed position in housing 3, but can be moved laterally out of housing 3 for repair purposes.

In the mounting position, the fitting element 7 is in the upper region of the housing 3, so that the upper edge 11 of the fitting element 7, therefore, ends almost at the same level as the top edge 12 of housing 3. In the mounting position, fiber optic cable 1 is inserted through slot 4 of the housing 3 of terminal 2, and into the opening 6 of fitting element 7 above blade 10.

In the operating position of the terminal, fitting element 7 is in the lower region of the housing 3 of terminal 2. Fitting element 7 is advantageously dimensioned such that its lower edge in the operating position lies on the bottom of the housing 3 of terminal 2. In the operating position, the fiber optic cable 1 inserted through the insertion opening of fitting element 7 is directly in front of the optical transmitting and/or receiving means 5. More accurately, face 8 of fiber optic cable 1 is directly in front of contact face 9 of optical transmitting and/or receiving means 5.

Figure 3:
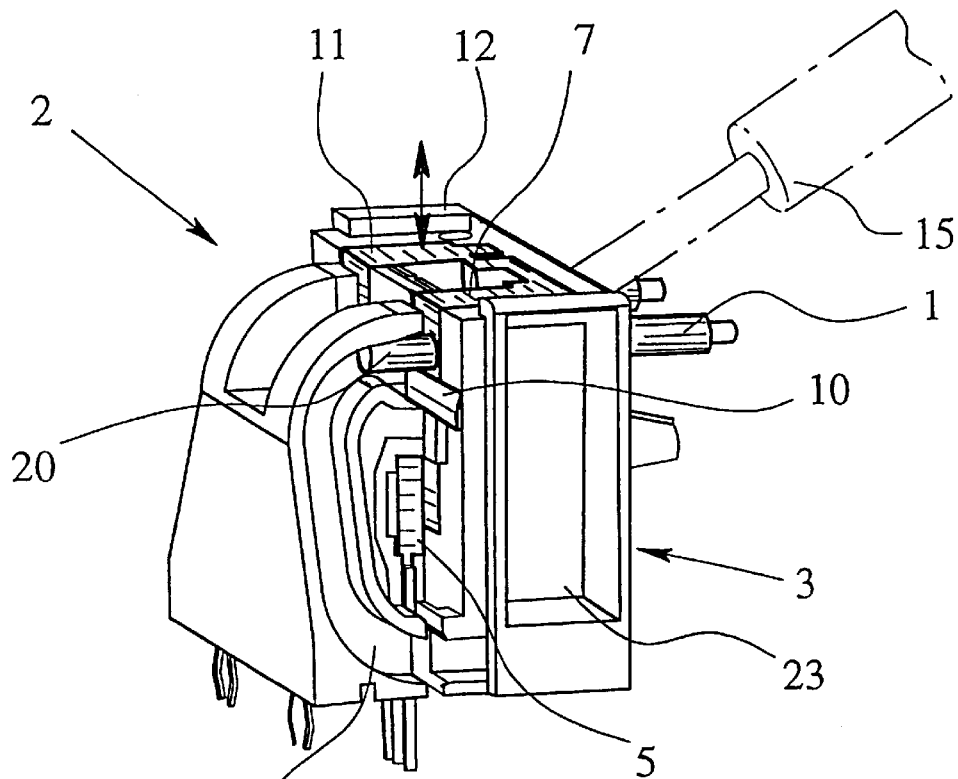
FIG. 3 is an oblique rear perspective view of the terminal from FIG. 1 in the mounting position.
Figure 4:
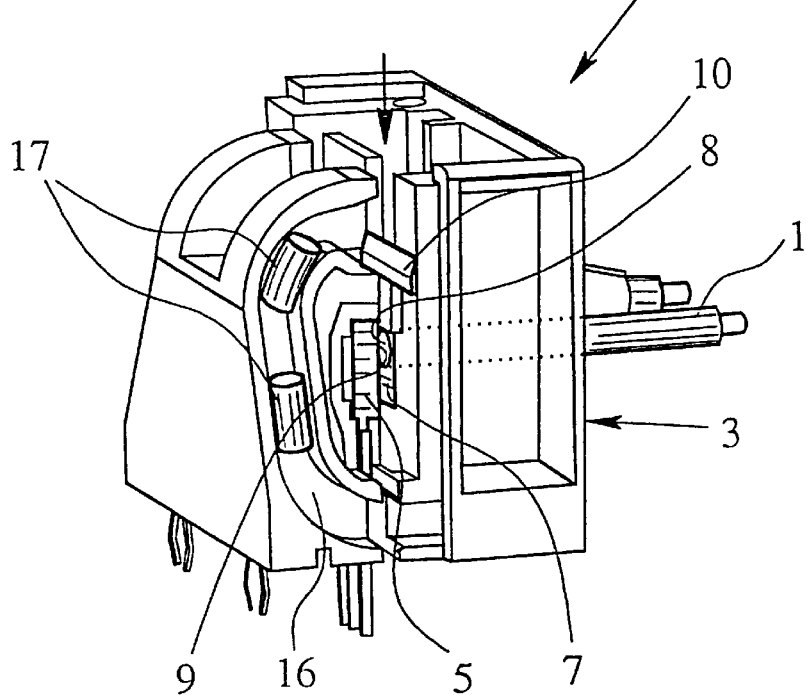
FIG. 4 is a view similar to that of FIG. 3, but showing the terminal in the operating position.
Figure 5:
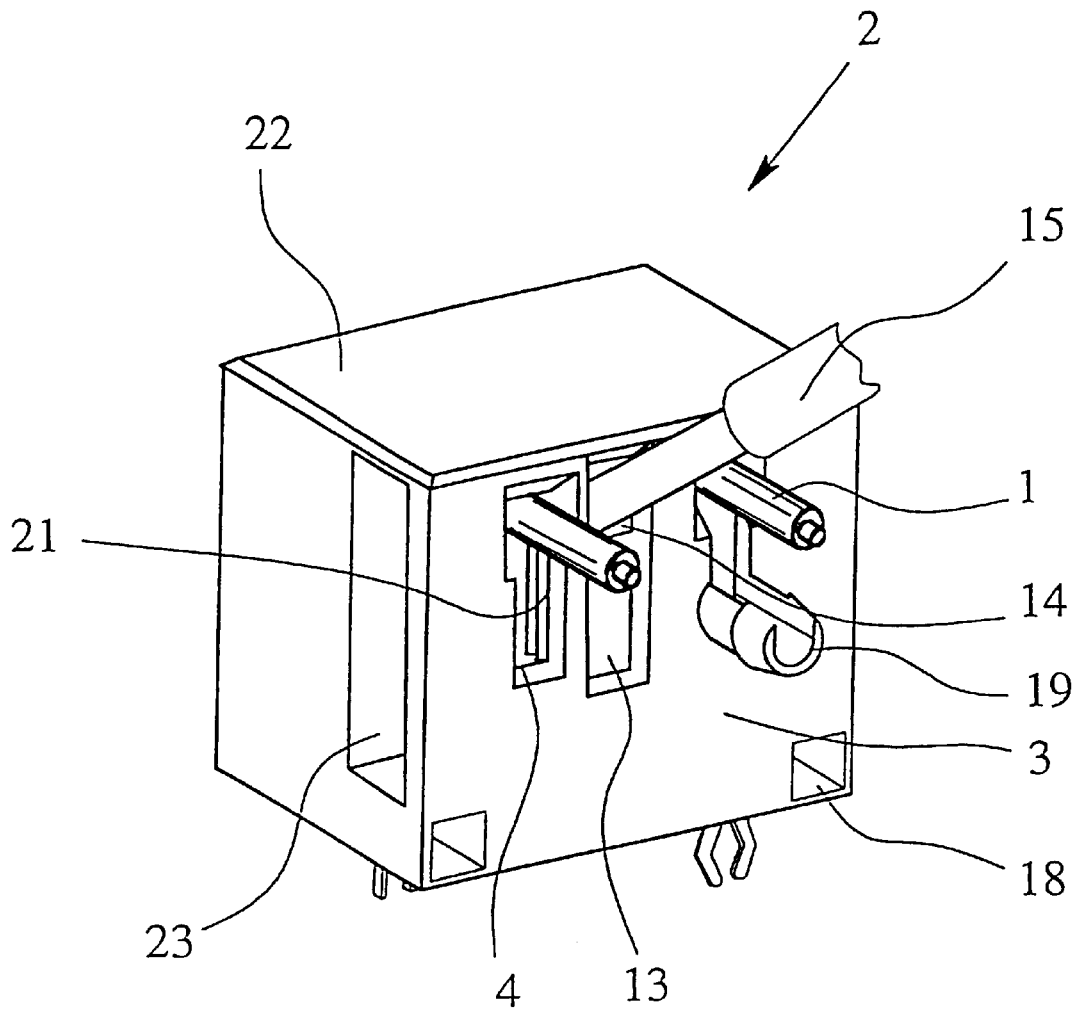
FIG. 5 is a front perspective view of the terminal from FIG. 1, but with a cover and in the mounting position.

To move fitting element 7 from the mounting position into the operating position and vice versa, in front face of the housing 3 of terminal 2, there is another slot 13 and in the fitting element 7 there is an engagement opening 14. Actuating means 15 can fit into a recess (not shown), which is used as an abutment, and is formed in a wall of a receiving space for fitting element 7 which is opposite the slot 13, through slot 13 and engagement opening 14 of fitting element 7. This actuating means 15 can, for example, be simply the tip of a screw driver, as is shown in FIGS. 3 & 5. Engagement opening 14 is used when moving fitting element 7 as an action point for the force applied to actuating means 15 and intensified according to the lever principle. Thus, only a small force is needed for moving fitting element 7 from the operating position into the mounting position and vice versa. In addition, during movement of fitting element 7 from the operating position into the mounting position and vice versa, contact faces 9 of optical transmitting and/or receiving means 5 are covered by fitting element 7 so that, on the one hand, no dirt can reach contact faces 9, and on the other hand, protection of the vision of the user is ensured in a transmitting means with high light output.

In FIGS. 1–4, two cable ducts 16 are visible which are used to hold the pieces 17 of the fiberoptic 1 cut off by blade 10. In each of the two bottom corners of the front face of the housing 3 of the terminal 2 is a hole which is used as an exit opening 18 for a respective one of the two cable ducts 16.

As is shown in FIGS. 1, 2, 4 and 5, in the embodiment shown, a fore-part 19 is provided at the bottom end of one of the two slots 4 and forms kink protection for fiber optic cable 1. Of course, there can also be two fore-parts 19 for kink protection of two fiber optic cables 1.

The terminal 2 according to the invention works as follows:

In the mounting position fiber optic cables 1 are pushed through slots 4 of the front face of the housing 3 and insertion openings 6 of fitting element 7 so that ends 21 of fiber optic cables 1 each project over blade 10. To change from the mounting position into the operating position, the fitting element 7 is moved downward by actuating means 15, which is fit into engagement opening 14 of fitting element 7. In doing so, the ends 20 of the fiber optic cables 1 which project beyond the fitting element 7 are cut off by blade 10 when the fitting element 7 moves downward. The cut off pieces 17 of the fiber optic cable are accommodated in the cable ducts 16. Finally, the fiberoptic cables 1 are disposed with their faces 8 exactly in front of the contact faces 9 of the optical transmitting and/or receiving means 5. The connection process of fiber optic cables 1 to the optical transmitting and/or receiving means 5 is ended. If the fiber optic cables 1 need to be replaced, fitting element 7 is simply moved out of the operating position into the mounting position by actuating means 15. The fiberoptic cables 1 can then be pulled out from the front of the housing 3 of terminal 2 and new fiber optic cables 1 can be inserted.

Figure 2:
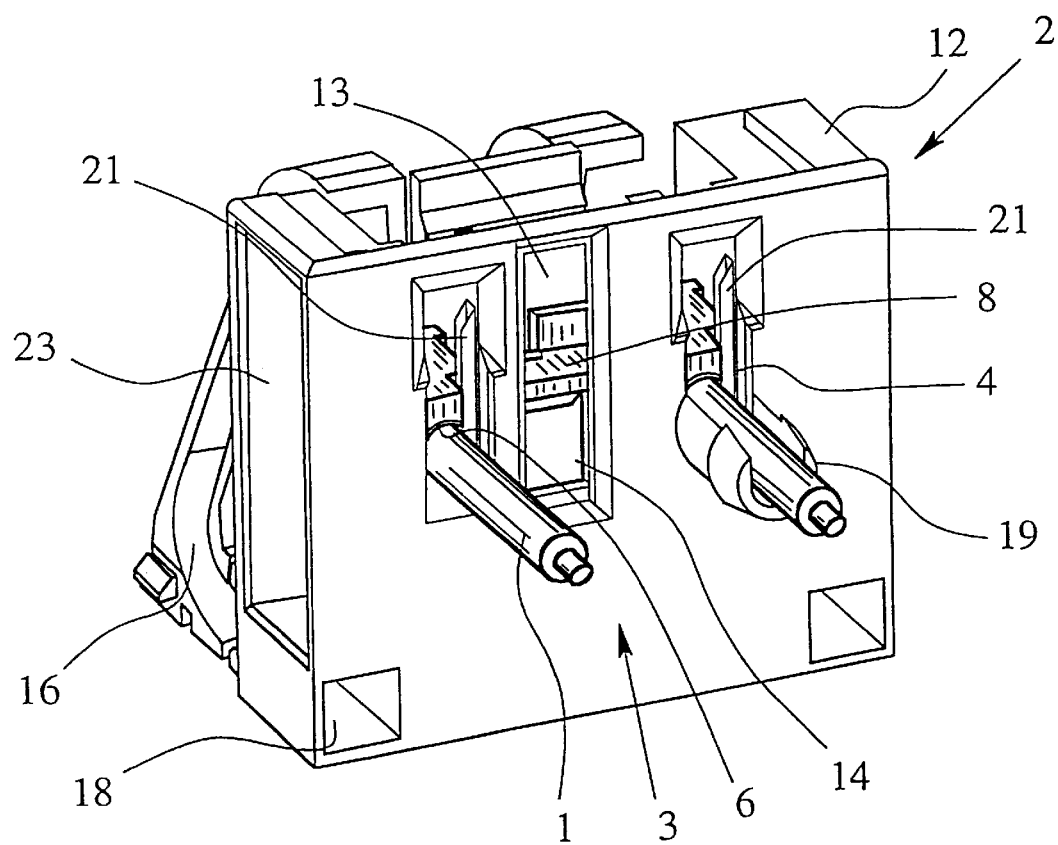
FIG. 2 is a front perspective view of the terminal from FIG. 1, likewise in the operating position.

In FIGS. 2 & 5, on the inside of slots 4, longitudinal ribs are visible which are provided as strain relief for the fiberoptic cables 1 inserted into slots 4. These longitudinal ribs 21 are used not only as strain relief for connected fiberoptic cables 1, but they also prevent the fiberoptic cables 1 from slipping during cutting of their ends 20 when fitting element 7 moves downward. In this way, straight cutting off of fiber optic cables 1 is ensured.

In FIG. 5, the housing 3 of the terminal is provided with an additional cover 22. On the one hand, cover 22 prevents penetration of dirt into housing 3, and on the other hand, outside light is prevented from influencing optical transmitting and/or receiving means 5. If cover 22 is made of metal, shielding of the optical transmitting and/or receiving means can also be achieved. Side surfaces 23 of housing 3 are made such that several terminals can be connected to one another to form a terminal unit.

We claim:

1. Terminal for at least one fiberoptic cable comprising a housing with a front face having at least one slot therein for receiving an end of a fiberoptic cable, at least one of an optical transmitting means and a receiving means, a fitting element which is movable within the housing by sliding and which has at least one insertion opening for a fiberoptic cable to be joined to said at least one of a transmitting means and a receiving means, and with a cutting means which has at least one blade; wherein the at least one insertion opening of the fitting element and an actuating means for sliding of the fitting element between a mounting position for receiving the at least one fiberoptic cable and an operating position in which the at least one fiberoptic cable is joined to the at least one of a transmitting means and a receiving means are provided at the same side of the housing.

2. Terminal as claimed in claim 1, wherein said actuating means comprises an additional slot in the front face of the housing and an engagement opening in the fitting element for engagement by an actuating member.

3. Terminal as claimed in claim 2, wherein a recess which acts as an abutment for the actuating member is provided in a wall of a receiving space of the housing in which the fitting element is located, said wall being on an opposite side of the receiving space relative to said slot.

4. Terminal as claimed in claim 3, wherein the housing has at least one cable duct for accommodating cut-off pieces of the at least one fiber optic cable.

5. Terminal as claimed in claim 2, wherein the housing has at least one cable duct for accommodating cut-off pieces of the at least one fiber optic cable.

6. Terminal as claimed in claim 1, wherein the housing has at least one cable duct for accommodating cut-off pieces of the at least one fiber optic cable.

7. Terminal as claimed in claim 1, wherein longitudinal ribs are formed on an inner face of said at least one slot as a means for relieving strain on a fiberoptic cable pushed into said at least one slot between said longitudinal ribs.

8. Terminal as claimed in claims 1, wherein the fitting element covers a contact face of the optical transmitting and/or receiving means in said operating position.

9. Terminal as claimed in claim 1, wherein the cutting means is positioned to cut off an end part of the fiberoptic cable during a downward motion of fitting element between the mounting position and the operating position.

10. Terminal as claimed in claim 1, wherein a cover is provided for closing the housing.

11. Terminal as claimed in claim 1, wherein at least one side surface of the housing is constructed for enabling the terminal to be joined with one another like terminal to form a terminal unit.

12. Terminal for at least one fiberoptic cable comprising a housing with a front face having at least one slot therein for receiving an end of a fiberoptic cable, at least one of an optical transmitting means and a receiving means, a fitting element which is movable within the housing by sliding and which has at least one insertion opening for a fiberoptic cable to be joined to said at least one of a transmitting means and a receiving means, and with a cutting means which has at least one blade; wherein the housing has at least one cable duct for discharging cut-off pieces of the at least one fiber optic cable from the housing.

13. Terminal as claimed in claim 12, wherein an exit opening of the cable duct is provided in the front face of the housing for discharging of the cut-off pieces of fiberoptic cable from the housing.

14. Terminal as claimed in claims 12, wherein the fitting element covers a contact face of the optical transmitting and/or receiving means in said operating position.

15. Terminal as claimed in claim 12, wherein the cutting means is positioned to cut off an end part of the fiberoptic cable during a downward motion of fitting element between the mounting position and the operating position.

16. Terminal as claimed in claim 12, wherein longitudinal ribs are formed on an inner face of said at least one slot as a means for relieving strain on a fiberoptic cable pushed into said at least one slot between said longitudinal ribs.

17. Terminal as claimed in claim 12, wherein a cover is provided for closing the housing.

18. Terminal as claimed in claim 12, wherein at least one side surface of the housing is constructed for enabling the terminal to be joined with one another like terminal to form a terminal unit.

19. Terminal for at least one fiberoptic cable comprising a housing with a front face having at least one slot therein for receiving an end of a fiberoptic cable, at least one of an optical transmitting means and a receiving means, a fitting element which is movable within the housing by sliding and which has at least one insertion opening for a fiberoptic cable to be joined to said at least one of a transmitting means and a receiving means, and with a cutting means which has at least one blade; wherein longitudinal ribs are formed on an inner face of said at least one slot as a means for relieving strain on a fiberoptic cable pushed into said at least one slot between said longitudinal ribs.

20. Terminal as claimed in claim 19, wherein a bottom area of said longitudinal ribs are bent in an inward direction toward an interior space of the housing.

21. Terminal as claimed in claim 19, wherein a cover is provided for closing the housing.

22. Terminal as claimed in claim 19, wherein at least one side surface of the housing is constructed for enabling the terminal to be joined with one another like terminal to form a terminal unit.

\* \* \* \* \*